(12) United States Patent
Shimo

(10) Patent No.: US 10,526,965 B2
(45) Date of Patent: Jan. 7, 2020

(54) IGNITION SYSTEM FOR CONSTANT VOLUME COMBUSTOR

(71) Applicant: Rolls-Royce Corporation, Indianapolis, IN (US)

(72) Inventor: Masayoshi Shimo, Carmel, IN (US)

(73) Assignee: Rolls-Royce Corporation, Indianapolis, IN (US)

( * ) Notice: Subject to any disclaimer, the term of this patent is extended or adjusted under 35 U.S.C. 154(b) by 499 days.

(21) Appl. No.: 15/142,378

(22) Filed: Apr. 29, 2016

(65) Prior Publication Data

US 2017/0314463 A1    Nov. 2, 2017

(51) Int. Cl.
  *F02C 5/04*    (2006.01)
  *F02C 7/266*   (2006.01)
  *F02C 3/16*    (2006.01)

(52) U.S. Cl.
  CPC .............. *F02C 3/165* (2013.01); *F02C 5/04* (2013.01); *F02C 7/266* (2013.01)

(58) Field of Classification Search
  CPC .. F02C 3/165; F02C 5/00; F02C 7/266; F02C 5/04; F23R 3/56; F04F 13/00
  USPC ............................................. 60/39.34, 39.35
  See application file for complete search history.

(56) References Cited

U.S. PATENT DOCUMENTS

| | | | | |
|---|---|---|---|---|
| 2,188,128 A * | 1/1940 | Armstrong | ............... | F02C 7/00 60/39.35 |
| 2,705,867 A | 4/1955 | Lewis | | |
| 2,864,346 A * | 12/1958 | Taylor, Jr. | ............. | F01C 1/3446 123/210 |
| 3,253,187 A * | 5/1966 | Short | .................... | F02P 7/0675 123/617 |
| 3,898,801 A * | 8/1975 | Grow | ........................ | F02C 5/04 60/247 |
| 4,086,879 A * | 5/1978 | Turnbull | ................. | F01C 1/063 123/216 |
| 4,384,480 A * | 5/1983 | Krage | .................... | G01M 15/06 701/102 |
| 6,901,738 B2 | 6/2005 | Sammann et al. | | |
| 7,111,463 B2 | 9/2006 | Sprouse et al. | | |
| 7,328,570 B2 * | 2/2008 | Venkataramani | ....... | F02K 7/005 60/247 |
| 2002/0068250 A1 | 6/2002 | Nalim | | |
| 2004/0123583 A1 * | 7/2004 | Nordeen | ................... | F02C 3/16 60/226.1 |
| 2004/0261396 A1 * | 12/2004 | Sammann | ................. | F02C 3/16 60/226.1 |

(Continued)

FOREIGN PATENT DOCUMENTS

WO          00/68566 A2     11/2000
WO       2008/070210 A2      6/2008

OTHER PUBLICATIONS

Saroff, "40 Years in the Desert: Revolutionary Aero Engine Concepts", available Online at http://40yrs.blogspot.hl/2008/05/revolutionary-aero-engine-concepts.html, May 18, 2008, 5 pages.

(Continued)

*Primary Examiner* — Ted Kim
(74) *Attorney, Agent, or Firm* — Barnes & Thornburg LLP

(57) ABSTRACT

A dynamic pressure exchanger configured for a combustion process includes a seal plate and a rotor assembly. The rotor assembly is mounted for rotation relative to the seal plate about a central axis of the dynamic pressure exchanger.

13 Claims, 5 Drawing Sheets

(56) References Cited

U.S. PATENT DOCUMENTS

| | | |
|---|---|---|
| 2007/0137172 A1 | 6/2007 | Rasheed et al. |
| 2008/0141651 A1 | 6/2008 | Eason et al. |
| 2009/0139241 A1 | 6/2009 | Hirata et al. |
| 2012/0324860 A1* | 12/2012 | Shimo .................... F02C 3/165 60/39.76 |
| 2013/0139487 A1* | 6/2013 | Kenyon ................... F23R 7/00 60/39.76 |

OTHER PUBLICATIONS

Extended European Search Report, European Application No. 17163539.4-1605, dated Nov. 16, 2017, 10 pages.
Akbari, Pezhman et al., A Review of Wave Rotor Technology and Its Applications, Journal of Engineering for Gas Turbines and Power, Oct. 2006, vol. 128., pp. 717-735.
Snyder, Philip et al., Assessment of a Wave Rotor Topped Demonstrator Gas Turbine Engine Concept, ASME-96-GT-41, Jun. 1996.
Wintenberger et al., Analytical Model for the Impulse of Single-Cycle Pulse Detonation Tube, Journal of Propulsion and Power, vol. 19, No. 1, Jan.-Feb. 2003.
European Official Action dated Sep. 7, 2018 issued in connection with European Patent Appln. No. 17163539.4, 5 pages.

* cited by examiner

IGNITION SYSTEM FOR CONSTANT VOLUME COMBUSTOR

FIELD OF THE DISCLOSURE

The present disclosure relates generally to dynamic pressure exchangers, and more specifically to ignition systems for constant volume combustors integrated into dynamic pressure exchangers.

BACKGROUND

Typical dynamic pressure exchangers may be configured for constant volume combustion. Some such dynamic pressure exchangers can include an inlet plate, an outlet plate spaced apart from the inlet plate along a central axis of the dynamic pressure exchanger, and a rotor drum positioned between the plates. The inlet plate provides an inlet port through which a flow of air and fuel pass into rotor passages formed in the rotor drum. The rotor drum receives and combusts the fuel-air mixture to produce hot high-pressure products as the rotor drum rotates about the central axis. The outlet plate provides an outlet port for the hot high-pressure products to exit the dynamic pressure exchanger.

Dynamic pressure exchangers can be used in gas turbine engines. In one example, dynamic pressure exchangers can provide at least part of a combustor used in a gas turbine engine. Such a dynamic pressure exchangers may receive compressed air from a compressor, may receive fuel from a fuel system, and may deliver combustion products to a turbine. However, dynamic pressure exchangers may be used in other suitable applications.

Due to the rotational speeds of the rotor assembly, dynamic pressure exchangers are limited in the amount of time available to complete the combustion process in each rotor passage before the gasses are expelled out of the outlet port. Fuel may be wasted and the dynamic pressure exchanger may have a lower efficiency if the air and fuel in each rotor passage cannot fully combust before being expelled through the outlet plate.

SUMMARY

The present disclosure may comprise one or more of the following features and combinations thereof.

According to the present disclosure, a dynamic pressure exchanger may include an inlet plate and a rotor assembly. The inlet plate may be formed to include an inlet port that extends circumferentially along an arc about a central axis of the dynamic pressure exchanger. The rotor assembly may be mounted for rotation relative to the inlet plate about the central axis. Further, the rotor assembly may be formed to include a plurality of axially-extending combustion cells arranged adjacent one another circumferentially around the central axis and arranged to align with the inlet port at predetermined intervals when the rotor assembly rotates about the central axis.

In illustrative embodiments, the dynamic pressure exchanger may include a plurality of spark ignitors or plugs. The plurality of spark ignitors may be configured to produce electric sparks when being electrically energized and at least two spark ignitors extend into each of the plurality of combustion cells.

In illustrative embodiments, the dynamic pressure exchanger may include at least one electrically energized terminal. The rotor assembly may be mounted for rotation relative to the at least one terminal about the central axis.

The at least two spark ignitors in each combustion cell may be configured to be electrically energized by the at least one terminal and produce an electric spark to ignite a fuel mixture in the combustion cell as the rotor assembly rotates about the central axis.

In illustrative embodiments, the at least one terminal may include at least two terminals. Each of the at least two terminals may be configured to align axially with a corresponding one of the at least two spark ignitors such that each spark ignitor is configured to contact one of the terminals per revolution as the rotor assembly rotates about the central axis. In illustrative embodiments, at least three spark ignitors may extend into each combustion cell.

In illustrative embodiments, the at least two spark ignitors that extend into each combustion cell may be electrically coupled together to cause each of the spark ignitors in a single combustion cell to produce electric sparks concurrently. The dynamic pressure exchanger may include a plurality of electrically energized terminals spaced apart from one another axially and circumferentially. The rotor assembly may be mounted for rotation relative to the terminals about the central axis. The plurality of terminals may be configured to cause each of the spark ignitors in a single combustion cell to produce electric sparks independent of the other spark ignitors in the single combustion cell.

In illustrative embodiments, the rotor assembly may include an inner tube, an outer tube arranged circumferentially around the inner tube, and a plurality of axially-extending webs located radially between the inner and outer tubes to define the combustion cells. At least one spark ignitor may extend radially through the outer tube into one of the plurality of combustion cells. At least one spark ignitor may extend radially through the inner tube into one of the plurality of combustion cells.

According to another aspect of the present disclosure, a dynamic pressure exchanger may include a rotor assembly and an ignition system. The rotor assembly may be mounted for rotation about a central axis of the dynamic pressure exchanger. The rotor assembly may be formed to define a plurality of axially-extending combustion cells arranged adjacent one another circumferentially around the central axis. Each combustion cell may be arranged to conduct a combustible fluid axially through the rotor assembly.

In illustrative embodiments, the ignition system may be configured to produce two or more axially spaced apart electric sparks in each combustion cell to cause the combustible fluid in each combustion cell to ignite in multiple locations.

In illustrative embodiments, the rotor assembly may include an inner tube, an outer tube arranged around the inner tube, and a plurality of axially-extending webs located radially between the inner and outer tubes to form the combustion cells. Further, the ignition system may include a plurality of spark ignitors that extend radially into each of the combustion cells.

In illustrative embodiments, the plurality of spark ignitors may extend radially through the outer tube into the combustion cells. The plurality of spark ignitors may extend radially through the inner tube into the combustion cells.

In illustrative embodiments, the ignition system includes at least one terminal and a plurality of spark ignitors that extend radially into each of the combustion cells. The rotor assembly may include configured to rotate relative to the at least one terminal to cause each spark ignitor to be electrically charged by the at least one terminal as each spark ignitor aligns circumferentially with the at least one terminal.

In illustrative embodiments, the at least one terminal and the plurality of spark ignitors are axially aligned. Each spark ignitor may be configured to contact the at least one terminal once per revolution as the rotor assembly rotates about the central axis.

In illustrative embodiments, the dynamic pressure exchanger may include an inlet plate formed to include an inlet port that extends circumferentially along an arc about the central axis of the dynamic pressure exchanger. The combustion cells may be arranged to align circumferentially with the inlet port as the rotor assembly rotates about the central axis relative to the inlet plate.

According to a further aspect of the present disclosure, a method of operating a dynamic pressure exchanger is taught. The method may include rotating a rotor assembly about a central axis of the dynamic pressure exchanger relative to an inlet plate formed to include an inlet port. The rotor assembly may be formed to include a plurality of combustion cells configured to align with the inlet port as the rotor assembly rotates about the central axis. The method may then further include conducting a fuel mixture into a first cell of the plurality of combustion cells through the inlet port while the first cell is aligned with the inlet port.

In illustrative embodiments, the method may include igniting the fuel mixture in the first cell at a plurality of ignition locations while the first cell is misaligned with the inlet port.

In illustrative embodiments, igniting the fuel mixture in the first cell may include electrically charging a plurality of spark ignitors that extend into the first cell to cause each spark ignitor to produce an electric spark.

In illustrative embodiments, the rotor assembly may include an inner tube, an outer tube arranged circumferentially around the inner tube, and a plurality of axially-extending webs located between the inner and outer tubes to define the plurality of combustion cells. The spark ignitors may extend radially inward into the outer tube toward the inner tube.

In illustrative embodiments, the method may include electrically charging a terminal arranged to power at least one spark ignitor that extends into the first cell. The spark ignitors may be configured to ignite the fuel mixture in the first cell in at least three locations.

These and other features of the present disclosure will become more apparent from the following description of the illustrative embodiments.

DETAILED DESCRIPTION OF THE DRAWINGS

Figure 1:
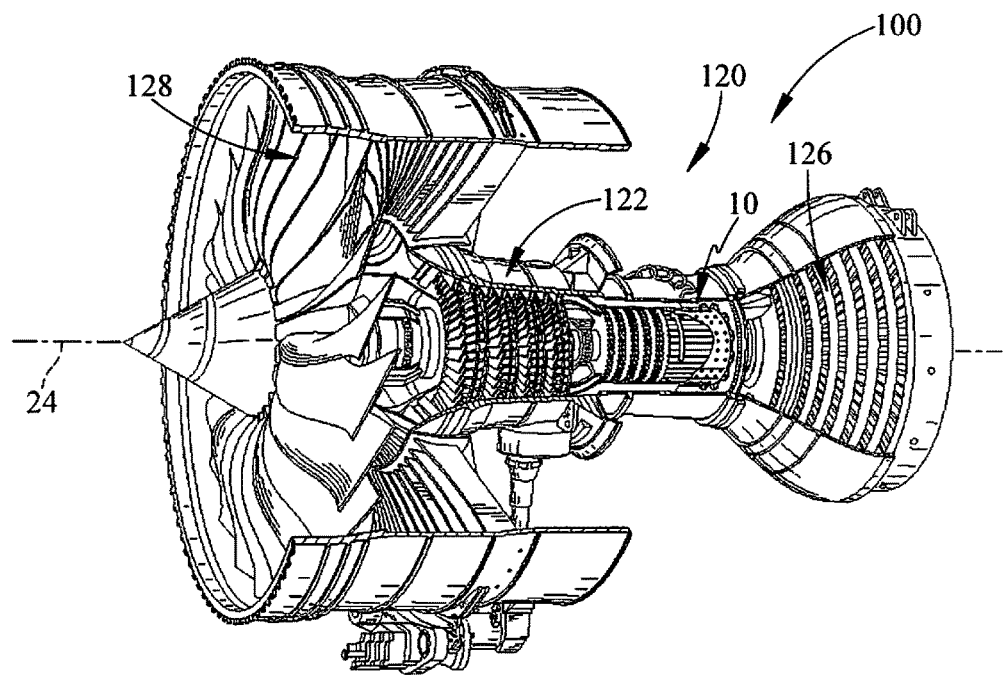
FIG. 1 is a cutaway view of a gas turbine engine including a dynamic pressure exchanger in accordance with the present disclosure, the dynamic pressure exchanger is configured for constant volume combustion and arranged to continuously receive and ignite a mixture of fuel and air to produce hot high-pressure products that are directed into a turbine to drive the engine.

For the purposes of promoting an understanding of the principles of the disclosure, reference will now be made to a number of illustrative embodiments illustrated in the drawings and specific language will be used to describe the same.

An illustrative gas turbine engine 100 includes a dynamic pressure exchanger 10 as part of an engine core 120 that powers a fan assembly 128 as shown in FIG. 1. The engine core 120 includes a compressor 122 and a turbine 126. The compressor 122 compresses air drawn into the engine 100 and delivers high-pressure air to the dynamic pressure exchanger 10. The dynamic pressure exchanger 10 is configured to receive and ignite a mixture 224 of the compressed air and fuel in a constant volume combustion process 200. Products of the combustion process 200 in the dynamic pressure exchanger 10 are directed into the turbine 126 where work is extracted to drive the compressor 122, the fan assembly 128 and, sometimes, an output shaft.

Figure 2:
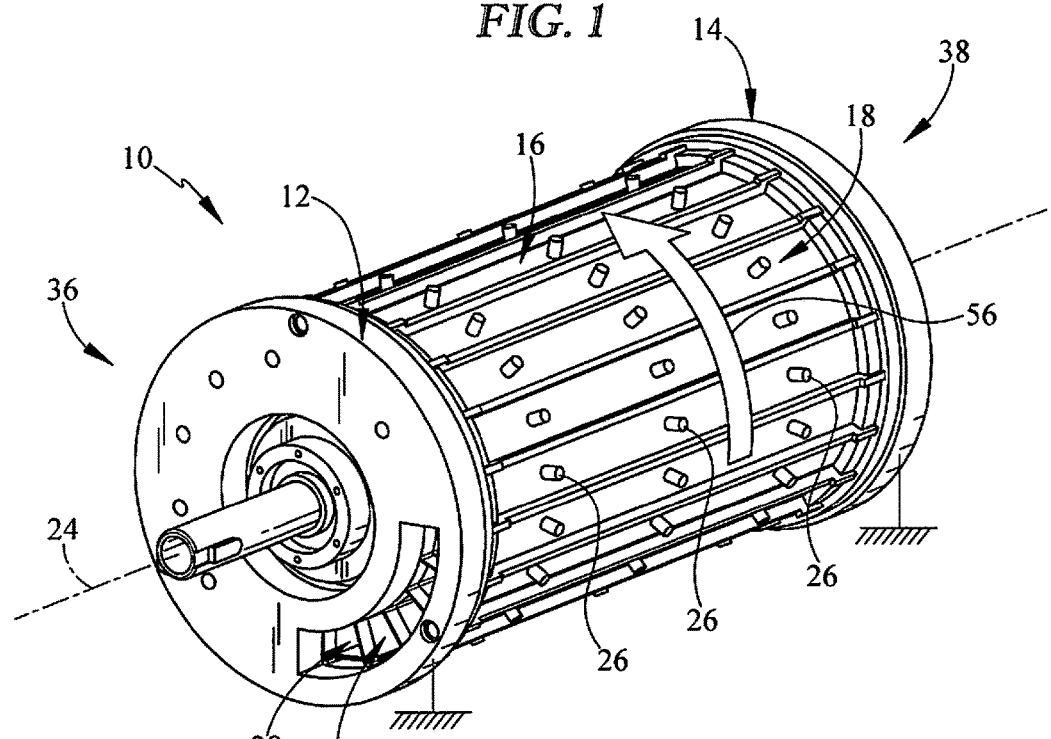
FIG. 2 is a perspective view of the dynamic pressure exchanger included in the gas turbine engine of FIG. 1 showing that the dynamic pressure exchanger includes, from left to right, an inlet plate, a rotor assembly configured to rotate relative to the inlet plate, an ignition system having a plurality of spark ignitors that extend into combustion cells formed in the rotor assembly, and an outlet plate.
Figure 3:
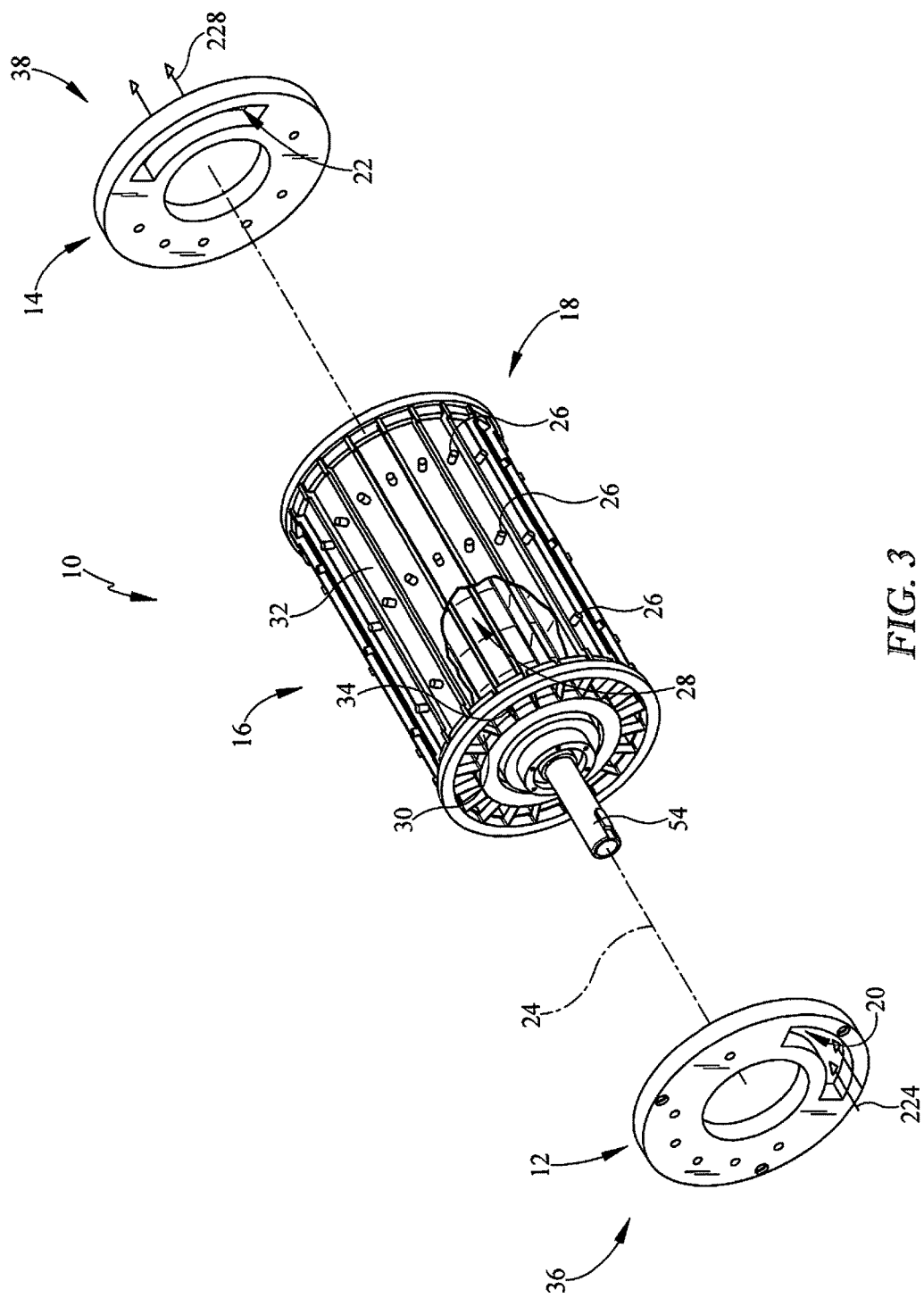
FIG. 3 is an exploded view of the dynamic pressure exchanger of FIG. 2 suggesting that the inlet plate is arranged to conduct fueled air into the rotor assembly, the rotor assembly is arranged to receive, combust, and exhaust a mixture of fuel and air, and the outlet plate is arranged to direct the gasses of the combustion process out of the rotor assembly into the turbine.
Figure 4:
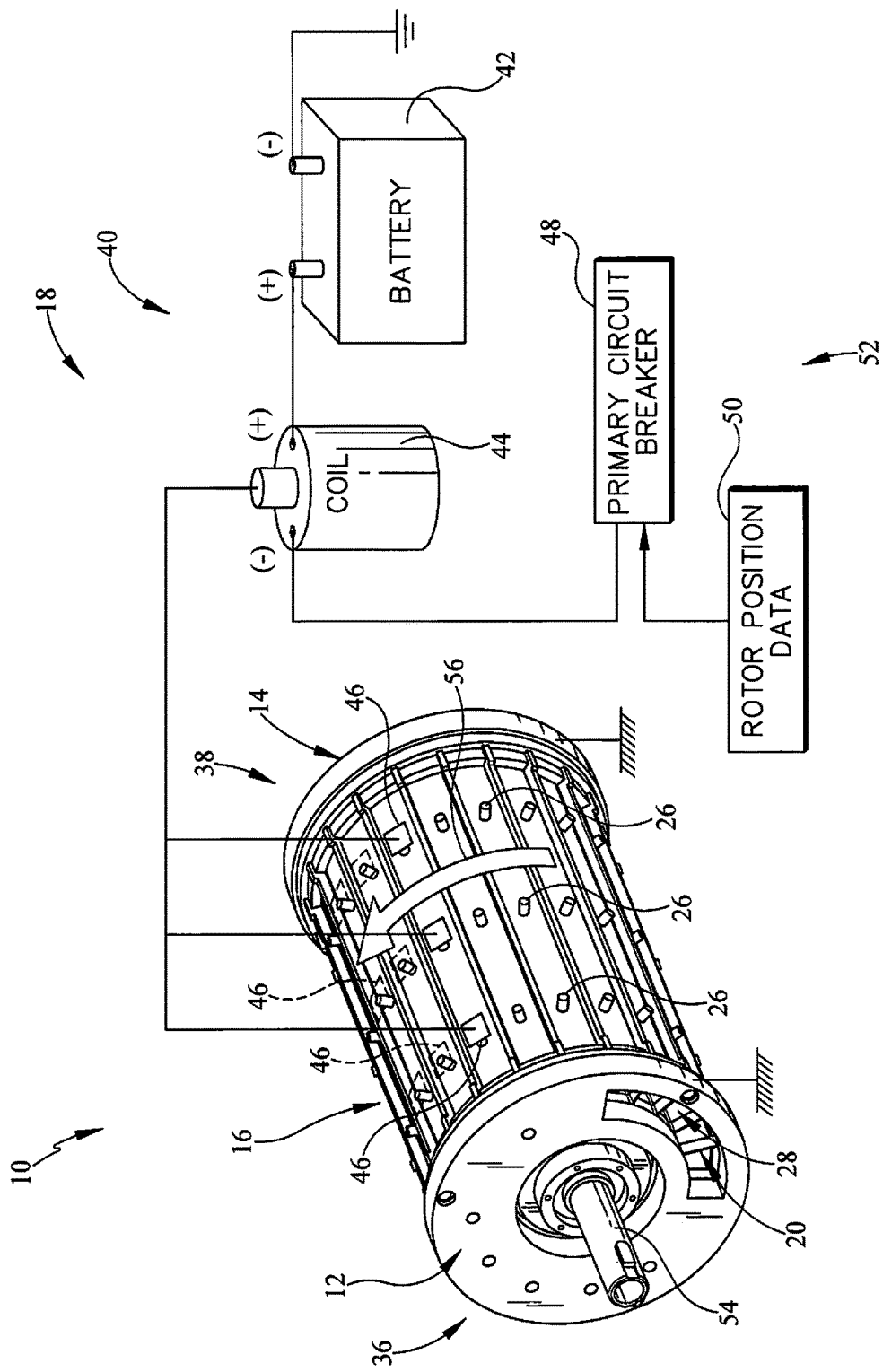
FIG. 4 is a perspective and diagrammatic view of the dynamic pressure exchanger of FIG. 2 suggesting that the ignition system includes the spark ignitors and a power system configured to energize the spark ignitors, the power system including a battery, a coil, a primary circuit breaker, and a plurality of metallic terminals configured to energize the spark ignitors when contacted by each spark ignitor.
Figure 5:
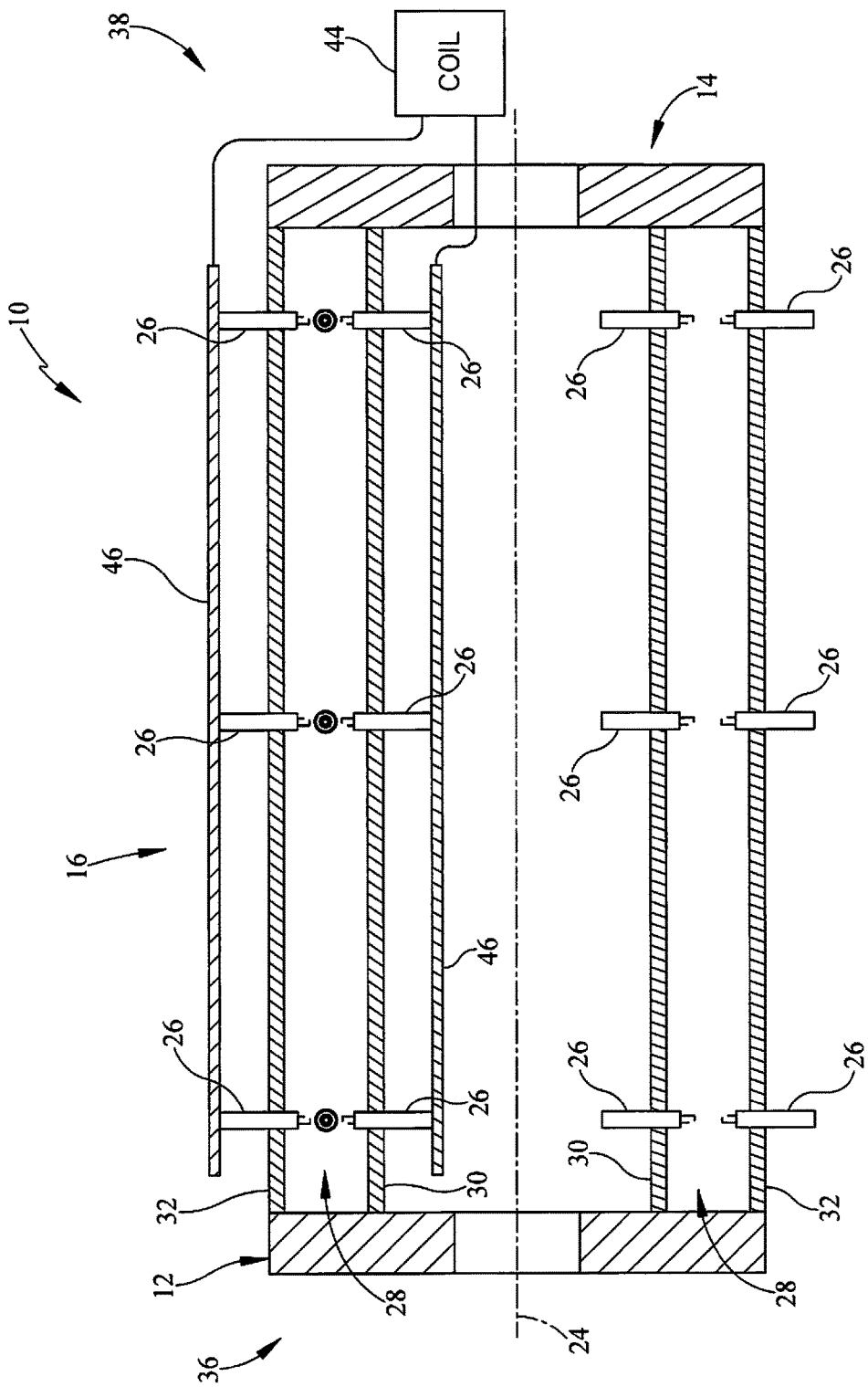
FIG. 5 is a sectional and diagrammatic view of the dynamic pressure exchanger of FIG. 2 showing that a plurality of spark ignitors extend into each combustion cell of the rotor assembly and that the spark ignitors are configured to be energized by metallic terminals as the rotor assembly rotates relative to the metallic terminals.

The dynamic pressure exchanger 10 includes a rotor assembly 16 and an ignition system 18 as shown in FIGS. 2 and 3. The rotor assembly 16 is configured to rotate relative to an inlet plate 12 and is formed to define a plurality of combustion cells 28 as shown in FIGS. 2 and 3. Each combustion cell 28 is configured to receive fueled air 224 (or other premixed reactants) from an inlet port 20 formed in the inlet plate 12 as the cells 28 align with the inlet port 20. The ignition system 18 includes a plurality of spark ignitors 26 that extend into the combustion cells 28 of the rotor assembly 16 as shown in FIGS. 4 and 5. Each spark ignitor 26 is configured to produce an electric spark to ignite the fueled air 224 in the corresponding combustion cell 28. Due to the high rotational speed of the rotor assembly 16, the fueled air 224 has a relatively short period of time to be fully combusted before the combustion cell 28 aligns with an outlet port 22 (sometimes called an exhaust port) at which point the gasses in the combustion cell 28 are expelled from the combustion cell.

Illustratively, each combustion cell 28 includes at least two spark ignitors 26 so that the fuel 224 is ignited at more than one ignition point. As a result, multiple ignitions are formed in each combustion cell 28 and each ignition wave travels only a portion of a length of the combustion cell 28 before the fueled air 224 is consumed by the several ignition waves. Thus, the multiple ignition points cause the fueled air 224 to be consumed in a relative short time period and the fuel 224 may be fully combusted before the cell 28 aligns with the outlet port 22.

In the illustrative embodiment, the dynamic pressure exchanger 10 is configured to use transient internal fluid flow to compress fuel and air prior to combustion to improve the efficiency of combustion within the dynamic pressure exchanger 10. The dynamic pressure exchanger 10 illustratively includes the inlet plate 12 (sometimes called an end plate or a seal plate), the outlet plate 14 (sometimes called an end plate or a seal plate) spaced apart from the inlet plate 12 along a central axis 24 of the dynamic pressure exchanger 10, the rotor assembly 16 positioned between the inlet and outlet plates 12, 14, and the ignition system 18 as shown in FIGS. 2 and 3.

The inlet plate 12 is arranged to direct the fueled air 224 into the combustion cells 28 of the rotor assembly 16 as suggested in FIGS. 2 and 3. The rotor assembly 16 is arranged to receive and combust the fueled air 224 to produce hot high-pressure products as part of the combustion process 200 as the rotor assembly 16 rotates about the central axis 24 relative to the inlet plate 12 and the outlet plate 14 as suggested by arrow 56 shown in FIG. 2. The ignition system 18 is configured to produce multiple ignition points in each combustion cell 28 to ignite the fueled air 224 in the rotor assembly 16 to cause the fueled air 224 to combust. The outlet plate 14 is arranged to direct the hot high-pressure products out of the rotor assembly 16 into the turbine 126 included in the engine 100 as suggested in FIG. 1.

The compressor 122 of the gas turbine engine 100 is located upstream of the dynamic pressure exchanger 10 as shown in FIG. 1. In the illustrative embodiment, the compressor 122 provides a flow of unfueled air 226 and fuel nozzles continuously spray fuel into a portion of the flow of unfueled air 226 upstream of the inlet port 20 to form the fueled air 224 as suggested in FIG. 6.

The inlet plate 12 is positioned adjacent an inlet end 36 of the rotor assembly 16 to conduct the flow of compressed fueled air 224 into the rotor assembly 16 as suggested in FIGS. 2 and 3. The illustrative inlet plate 12 is formed to include the inlet port 20 which is arranged to direct a portion of the flow of fueled air 224 into the combustion cells 28 of the rotor assembly 16 as each combustion cell 28 temporarily aligns with the inlet port 20. Illustratively, the inlet port 20 extends axially through the inlet plate 12 along an arc around the central axis 24 as shown in FIG. 3.

The illustrative rotor assembly 16 includes an inner tube 30, an outer tube 32, and a plurality of webs 34 as shown in FIG. 3. The outer tube 32 is arranged circumferentially around the inner tube 30. The axially-extending webs 34 are located radially between the inner and outer tubes 30, 32 to define the combustion cells 28. As a result, the combustion cells 28 extend axially between the inlet end 36 and an outlet end 38 of the rotor assembly 16 as shown in FIG. 3.

In other embodiments, the combustion cells 28 extend axially along and circumferentially about the central axis 24. In the illustrative embodiment, the rotor assembly 16 is rotated by a shaft 54. In some embodiments, the combustion cells 28 are arranged to cause the rotor assembly 16 to rotate as a result of the shape of the combustion cells 28 and the combustion processes that occurs within the combustion cells 28.

The ignition system 18 includes the plurality of spark ignitors 26 as shown in FIG. 4. The spark ignitors 26 are configured to ignite the fueled air 224 in a given combustion cell 28 aligned at a first angular position relative to the central axis 24 as suggested in FIG. 4. In the illustrative embodiment, the first angular position is spaced apart circumferentially from the inlet port 20 to cause the spark ignitors 26 to ignite the fueled air in a given combustion cell 28 when that combustion cell 28 is misaligned with the inlet port 20 such that the forward end of the combustion cell 28 is closed by the inlet plate 12. As a result, the combusted products 228 are blocked from flowing upstream into the flow of fueled air 224 by the inlet plate 12. In the illustrative embodiment, the first angular position is spaced apart from the inlet port 20 such that the spark ignitors 26 ignite the fueled air 224 after the forward end of the combustion cells 28 are closed by the inlet plate 12 to provide the longest time period for the combustion process to occur in the combustion cell 28 before the combustion cell 28 opens into the outlet port 22.

In some embodiments, at least two spark ignitors 26 extend into each of the combustion cells 28. Illustratively, three spark ignitors 26 extend into each combustion cell 28. In other embodiments, any numbers of spark ignitors 26 extend into each combustion cell 28, including a single spark ignitor in some embodiments. In some embodiments, a different number of spark ignitors 26 extend into some of the combustion cells 28.

The spark ignitors 26 may extend through the outer tube 32 and/or the inner tube 30 as shown in FIGS. 4 and 5. In one illustrative embodiment, three spark ignitors 26 extend radially inward through the outer tube 32 toward the inner tube 30 and three spark ignitors 26 extend radially outward through the inner tube 30 toward the outer tube 32 as shown in FIG. 5. The spark ignitors 26 that extend through a single combustion cell 28 are spaced apart axially as shown in FIG. 4. In some embodiments, the spark ignitors 26 that extend through a single combustion cell 28 are spaced apart circumferentially and axially.

Illustratively, the spark ignitors 26 comprise spark plugs. In other embodiments, the spark ignitors 26 comprise laser ignitors.

Dynamic pressure exchangers may have a single ignition point in each combustion cell which produces an ignition wave that travels an entire length of the combustion cell to combust the fueled air. In such designs, the fueled air may be combusted over a relatively long time period in combustion cells with a single ignition point. As a result, the fueled air may not fully combust before the combustion cell aligns with the outlet port such that the non-combusted fuel in the combustion cell is wasted and the efficiency of the dynamic pressure exchanger is reduced.

In the illustrative embodiment, the ignition system 18 further includes a power system 40 as shown in FIG. 4. The illustrative power system 40 includes an electric power source 42, a coil 44, a plurality of terminals 46, and a primary circuit breaker 48. Although FIG. 5 illustrates all spark ignitors/plugs 26 are connected to a single coil 44, each spark ignitor/plug 26 can be connected to a single coil separately allowing the system 18 to control ignition timing in any way the dynamic pressure exchanger 10 should be operated. The power source 42 is configured to provide power to energize the spark ignitors 26. The coil 44 is configured to increase the voltage of the power of the power source 42. The illustrative terminals 46 are configured to contact the spark ignitors 26 to complete a circuit and conduct power to the spark ignitors 26. The primary circuit 48 is configured to control spark timing of the ignition system 18. In the illustrative embodiment, the spark ignitors 26 are connected to ground to complete the electric circuit. In some embodiments, the spark ignitors 26 are connected to ground through the rotor assembly 16.

In the illustrative embodiment, the electric power source 42 comprises a battery 42 as shown in FIG. 4. In other embodiments, the electric power source 42 is a generator configured to produce electricity.

The coil 44 is configured to increase the voltage of the power from the power source 42 to a higher voltage for powering the spark ignitors 26 and to transmit the higher voltage power to the terminals 46. Illustratively, the coil 44 is coupled to the primary circuit breaker 48 for controlling the ignition point based on a position of the rotor assembly 16 as shown in FIG. 4. The coil 44 is further connected to the power source 42 and the terminals 46. In the illustrative embodiment, the plurality of terminals 46 is coupled to a single coil 44 as shown in FIG. 4. In some embodiments, each terminal 46 is coupled to a corresponding coil 44. In some embodiments, each terminal 46 is coupled to a plurality of coils 44.

The terminals 46 are configured to energize the spark ignitors 26 to cause the spark ignitors 26 to produce sparks as shown in FIG. 5. In the illustrative embodiment, the plurality of terminals 46 include a terminal 46 for each spark ignitor 26 that extends into a single combustion cell 28. Illustratively, the ignition system 18 includes three terminals 46 corresponding to the spark ignitors 26 extending into the outer tube 32. In other embodiments, the ignition system 18 includes one or more inner terminals 46 corresponding to the spark ignitors 26 extending into the inner tube 30 as shown in FIG. 5.

The terminals 46 are spaced apart from one another axially and are configured to align axially with the spark ignitors 26 as shown in FIG. 4. Illustratively, the terminals 46 comprise metallic materials and the rotor assembly 16 is configured to rotate relative to the terminals 46 as suggested in FIG. 4. As the rotor assembly 16 rotates, each spark ignitors 26 contacts a terminal 46 at least once per revolution. When a spark ignitor 26 contacts a terminal 46, power from the power source 42 is conducted into the spark ignitors 26 to energize the spark ignitor 26. As a result, spark duration may be controlled by a circumferential length of each terminal 46.

In some embodiments, the ignition system 18 includes additional terminals 46 that are spaced apart from one another axially and circumferentially as suggested in FIG. 4. In such embodiments, the spark timing may be controlled by energizing the terminals 46 closest to the inlet port 20 such as, for example, at a max rotational speed of the rotor assembly 16 and/or energizing the terminals 46 furthest from the inlet port 20 such as, for example, at a minimum rotational speed of the rotor assembly 16. Any combination of energized terminals 46 and spark timing could be performed with the plurality of terminals 46. As a result, ignition timing may be coordinated with a propagation wave formed in each combustion cell 28 to increase the performance of the dynamic pressure exchanger 10.

In some embodiments, the ignition system 18 includes a single terminal 46 configured to contact each of the spark ignitors 26 in a single combustion cell 28. In some embodiments, the terminals 46 are constantly connected to the spark ignitors 26 and the primary circuit breaker 48 controls the timing for conducting energy to the spark ignitors 26.

In some embodiments, the ignition system 18 includes a timing system 52 (sometimes called a control system) configured to energize the spark ignitors 26 at predetermined intervals as suggested in FIG. 4. In some embodiments, the timing system 52 is configured to determine the intervals to excite the spark ignitors 26 based on performance feedback of the dynamic pressure exchanger 10 received from sensors (i.e. temperature sensors, speed sensors, flow sensors, etc.). In some embodiments, spark timing is coupled with position data 50 of the rotor assembly 16 such that the primary circuit breaker 48 controls the ignition timing based on encoder information or a magnetic pickup signal.

The outlet plate 14 is configured to direct the hot-high pressure combustion products out of the rotor assembly 16 toward the turbine 126 as suggested in FIGS. 1 and 2. The outlet plate 14 is positioned adjacent the rotor assembly 16 to close the outlet end 38 of the rotor assembly 16 to control the flow of combustion products directed out of the rotor assembly 16.

The illustrative outlet plate 14 is formed to include the outlet port 22 as shown in FIG. 3. The hot-high pressure combustion products are expelled out of the outlet end 38 of the combustion cells 28 through the outlet port 22 as each combustion cell 28 aligns with the outlet port 22. Illustratively, the outlet port 22 extends axially through the outlet plate 14 along an arc around the central axis 24 as shown in FIG. 3. Illustratively, the outlet port 22 is circumferentially offset from the inlet port 20 by about 180 degrees. In some embodiments, the dynamic pressure exchanger 10 is configured for two or more combustion cycles to occur simultaneously. In some embodiments, the inlet plate is formed to include more than one inlet port and the outlet plate is formed to include more than one outlet port.

During operation of the dynamic pressure exchanger 10, premixed reactants 224 flow into the combustion cells 28 as each combustion cell 28 aligns with the inlet port 20 as suggested in FIG. 3. Each combustion cell 28 is closed at both ends by the plates 12, 14 in response to the position of the combustion cell 28 relative to the plates 12, 14. As the rotor assembly 16 rotates about the central axis 24, the spark ignitors 26 extending through the combustion cell 28 contact the stationary metallic terminals 46. The spark ignitors 26 produce a plurality of ignition points in the combustion cell 28, as suggested in FIG. 5, and combustion of the fueled air 224 is completed before the combustion cell 28 aligns with and opens into the outlet port 22. Opening of the outlet port 22 allows the combustion cell 28 to initiate a blowdown process of high pressure products from the cell 2.

Figure 6:
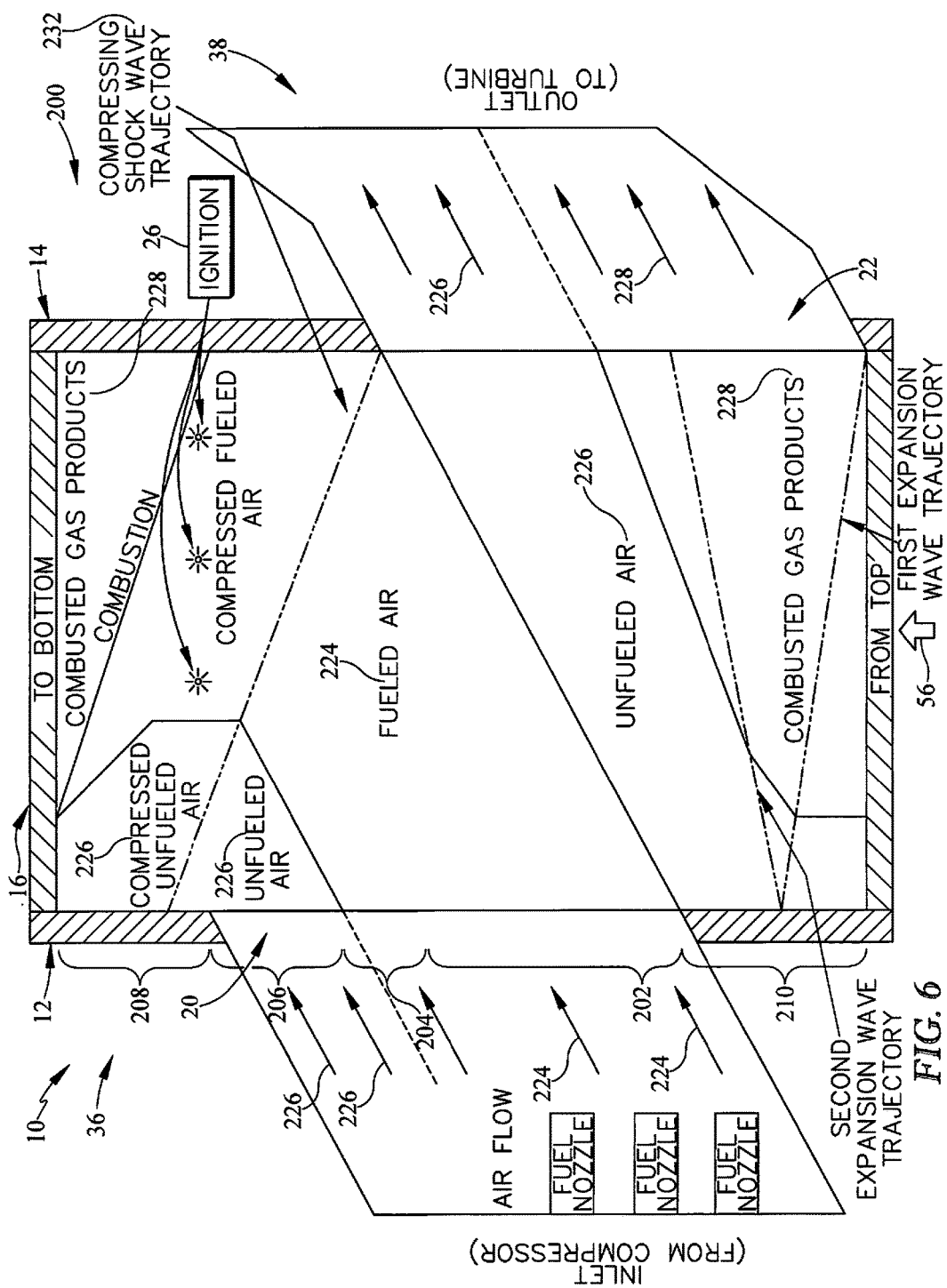
FIG. 6 is a diagrammatic view of a combustion process that occurs within each combustion cell of the dynamic pressure exchanger and depicts the cycle of a single combustion cell at continuous circumferential positions as it completes a revolution about a central axis of the dynamic pressure exchanger.

The constant volume combustion process 200 is depicted in a space-time wave diagram shown in FIG. 6. The illustrative combustion process 200 occurs within each of the combustion cells 28 as the rotor assembly 16 rotates about the central axis 24. The wave diagram depicts a sequence of events occurring during one combustion cycle within the combustion cells 28 in continuous circumferential positions. The arrow 56 indicates the direction of rotation of the combustion cells 28.

The combustion process 200 is periodic such that the top of the wave diagram shown in FIG. 6 loops around and joins with its own bottom. The wave diagram, for the purpose of description, may be started at any point. However, for convenience, the description is started at step 202 toward the bottom of the wave diagram.

In step 202, one of the combustion cells 28 aligns with and opens into the inlet port 20 as shown in FIG. 6. Fueled air 224 is directed through the inlet port 20 into the combustion cell 28. The fueled air 224 has relatively greater pressure than the remaining unfueled air 226 and combusted gas products 228 located in the combustion cell 28. As such, the fueled air 224 is drawn into the combustion cell 28 and the unfueled air 226 and combusted gas products 228 flow axially out of the combustion cell 28 through the outlet port 22. Unfueled air 226 from the previous combustion cycle provides a buffer between the fueled air 224 and combusted gas products 228 from the previous cycle. As such, the fueled air 224 is blocked from being ignited unintentionally by the combusted gas products 228 in the combustion cell 28.

In a step 204, the unfueled air 226 is significantly expelled out of the outlet end 38 of the combustion cell 28 and the combustion cell 28 rotates beyond the outlet port 22 as shown in FIG. 6. As a result, the outlet plate 14 blocks fueled air 224 in the combustion cell 28 from escaping through the outlet end 38 of the combustion cell 28. A shock wave 232 initiates at the outlet end 38 of the combustion cell 28 and propagates toward the inlet end 36 to compress the fueled air 224 in response to the outlet plate 14 closing the outlet end 38 of the combustion cell 28 as suggested in FIG. 6.

In a step 206, the combustion cell 28 has rotated and is no longer aligned with the flow of fueled air 224 as shown in FIG. 6. Nonetheless, the flow of unfueled air 226 continues to enter the combustion cell 28 to provide the buffer of unfueled air 226 in the illustrative embodiment.

In a step 208, the combustion cell 28 rotates further about the central axis 24 and is no longer aligned with the inlet port 20 as shown in FIG. 6. As a result, the inlet plate 12 blocks the flow of unfueled air 226 from entering the combustion cell 28. The spark ignitors 26 contact the terminals 46 to cause the spark ignitors 26 to produce multiple ignition points and ignite the compressed fueled air 224 in the combustion cell 28. The fueled air 224 expands to form the combusted gas products 228 and the unfueled air 226 experiences no combustion.

In a step 210, the outlet end 38 of the combustion cell 28 aligns with and opens into the outlet port 22 formed in the outlet plate 14 while the inlet end 36 of the combustion cell 28 is blocked by the inlet plate 12 as shown in FIG. 6. The combusted gas products 228 expand and exit the combustion cell 28 through the relatively low-pressure outlet port 22. The gas products 228 are directed into the turbine 126 to power the engine 100. The combustion cell 28 continues to rotate about the central axis 24 and returns to step 202 as shown in FIG. 6.

In the illustrative embodiment, the disclosed features are included in a dynamic pressure exchanger 10 arranged for constant volume combustion. In other embodiments, the disclosed features may be included in pressure exchangers, flow dividers, flow combiners, wave rotors, etc. In some embodiments, the rotor assembly includes an inner rotor and an outer rotor arranged around the inner rotor. Such a rotor assembly is configured to transfer heat from hot combustion zones of the inner and outer rotors to cool inlet zones of the inner and outer rotors. The rotor assembly may include a plurality of spark ignitors that extend into the inner rotor and/or a plurality of spark ignitors that extend into the outer rotor.

In some embodiments, a constant volume combustor (CVC) integrated into a dynamic pressure exchanger (DPE) is equipped with multiple spark plugs (or another ignition source such as, for example, a laser ignition system) in each cell from either outside or inside of the rotor along the axial direction as shown in FIG. 2. The number of spark plugs is dependent on the size of the combustor or the range of operating conditions (e.g. rotor speed) associated with the available combustion time in a single cycle; the number of available spark plugs (or total available spark energy) per cell controls the amount of time to complete the combustion process in each cell.

In some embodiments, the end of each spark plug has an electrode allowing a high-voltage pulse to run from an ignition coil when the spark plugs contacts a stationary metal tip (sometimes called a terminal) located outside of the rotor as shown in FIG. 4. In some embodiments, the metal tips mounted outside of the rotor are axially aligned with the spark plug electrodes; spark timing is coupled with the position of the rotor such that a primary circuit breaker may be used to control the ignition timing based on encoder information or a magnetic pickup signal, for example. Spark duration may be mechanically controlled based on the size of each stationary metal tip allowing each spark plug electrode to contact the metal tip per revolution.

In the illustrative embodiment, each stationary metal tip is connected to the ignition coil as shown in FIG. 4. The metal tips are connected to a single coil or multiple separated coils depending on the configuration. The primary circuit of the coil may be connected to a battery and a circuit breaker controlling the ignition point based on the rotor position. The rotor position can be identified by either an encoder or a magnetic pickup signal; the ignition system may be controlled by the rotor position.

The suggested approach disclosed herein for constant volume combustion ignition systems may have a number of advantages. One potential advantage is that it may experience little to no drag loss associated with a flame acceleration process. One of the initiation schemes to achieve constant volume combustion process is to use a flame accelerator which uses a non-isentropic heating process to increase a flame speed. However, it may cause significant drag loss during each phase (initiation, blowdown, purging and filling processes) which consequently ends up with a poor specific fuel consumption of the system. The ignition system 18 may not include any such flame accelerator inside of the cell leading to no pressure loss associated with a flame accelerator. Instead, the combustion process may be initiated by multiple spark ignitions.

Another advantage may be that it can be easy to control combustion time with the ignition system 18. In some embodiments, the available combustion time is dependent on rotational speed of the dynamic pressure exchanger (DPE) such that the available combustion time is minimized at a maximum rotational rotor speed (i.e., at full throttle). The number of spark plugs at each cell may be used to control the amount of time needed to complete the combustion process due to maximum available ignition energy per cell.

Another advantage may be that the ignition system 18 may be robust and cost-effective because a mechanically simplified design is possible. Spark duration and ignition timing can be controlled by the size of the stationary metal tips and an encoder or a magnetic pickup signal may be calibrated during the design process.

A schematic diagram of an illustrative ignition system 18 is presented in FIGS. 4 and 5. Illustratively, each spark plug has at least one contact with a stationary metal tip per revolution of the rotor. FIG. 2 shows an example of the rotor alignment relative to the intake and exhaust seal plates; both seal plates are stationary relative to the rotor assembly. During operation, premixed reactants continuously flow through the inlet port filling each cell of the rotor by its rotational motion. After the premixed reactants flow into cells of the rotor, both ends of the cells are closed by the seal plates due to their position relative to the seal plates. When a cell is circumferentially moved to have contact with one of the stationary metal tips, ignition is initiated by the spark plug and the combustion is completed before the cell begins to open at the exhaust port. Opening the cell to the exhaust port allows the rotor to initiate a blowdown process of high pressure products in the cell. Further rotation of the rotor causes the inlet side of the cell to open which initiates the filling process for the next cycle.

The configuration derivative of the ignition system is shown in FIG. 5 showing ignitions at an upper cell due to contact with one of the stationary metal tips. The spark plugs may be installed from radially inside, from radially outside, or from both sides of the rotor. In some embodiments, the stationary metal tips re integrated into an elongated plate. Illustratively, a relatively short height spark plug is used for integration purposes.

Pressure gain combustors such as, for example, constant volume combustors may offer superior thermodynamic performance relative to constant pressure combustors due to their significant reduction of entropy production. Dynamic pressure-exchangers, which may be called pressure-wave-in-rotor devices or more simply wave rotors, offer a way to compress a body of fluid by pressure forces and simultaneously to expand another body of fluid without incorporating a compressor. Integration of a pressure gain combustor into a dynamic pressure exchanger may produce a higher stagnation pressure at the discharge of combustion products than the stagnation pressure of the entering air flow, but it may maintain a lower temperature than the maximum turbine inlet temperature due to the cooling in the expansion. This may lead to specific fuel consumption reduction compared with conventional gas turbine systems.

The disclosure may also offer a way to confine the non-steady flow portion to the cells (or passages) maintaining the steady flow portion in the intake/exhaust ducts due to continuous motion of the cells over the ducts. This feature of the concept could offer a remedy and performance improvement of hybrid gas turbine systems due to isolation of unsteady gas dynamics from compressor and turbine stages. Although the flow exhausted from the exhaust port may be non-uniform in terms of total pressure/temperature and velocity which might poses issues in the integration with turbine stages, an appropriate design of transition duct could minimize the ducting losses associated with the non-uniform flow. In terms of how to achieve constant volume combustion processes, flame speed sometimes needs to be high enough to complete the combustion process before the next cycle is initiated. In general, a flame accelerator is included inside the cell for fuel-air mixtures as propellants. The presence of such a device inside of the cell may cause internal drag losses during the flame acceleration process such that overall performance could be deteriorated. It may be helpful to design the constant volume ignition system with minimum pressure loss during the process.

While the disclosure has been illustrated and described in detail in the foregoing drawings and description, the same is to be considered as exemplary and not restrictive in character, it being understood that only illustrative embodiments thereof have been shown and described and that all changes and modifications that come within the spirit of the disclosure are desired to be protected.

What is claimed is:

1. A dynamic pressure exchanger comprising
an inlet plate formed to include an inlet port that extends circumferentially along an arc about a central axis of the dynamic pressure exchanger,
a rotor assembly mounted for rotation relative to the inlet plate about the central axis, the rotor assembly formed to include a plurality of axially-extending combustion cells arranged adjacent one another circumferentially around the central axis and arranged to align with the inlet port at predetermined intervals when the rotor assembly rotates about the central axis,
a plurality of electrically energized terminals spaced apart from one another axially and circumferentially around the rotor assembly to ignite the plurality of spark ignitors at different circumferential locations relative to one another, the rotor assembly mounted for rotation relative to the terminals about the central axis, and
the plurality of terminals are configured to cause each of the spark ignitors in a single combustion cell to produce electric sparks independent of the other spark ignitors in the single combustion cell.

2. The dynamic pressure exchanger of claim 1, wherein each spark ignitor is configured to contact one of the terminals per revolution as the rotor assembly rotates about the central axis.

3. The dynamic pressure exchanger of claim 1, wherein at least three spark ignitors extend into each combustion cell.

4. The dynamic pressure exchanger of claim 1, wherein the at least two spark ignitors that extend into each combustion cell are electrically coupled together to cause each of the spark ignitors in a single combustion cell to produce electric sparks concurrently.

5. The dynamic pressure exchanger of claim 1, wherein the rotor assembly includes an inner tube, an outer tube arranged circumferentially around the inner tube, and a plurality of axially-extending webs located radially between the inner and outer tubes to define the combustion cells.

6. The dynamic pressure exchanger of claim 5, wherein at least one spark ignitor extends radially through the outer tube into one of the plurality of combustion cells.

7. The dynamic pressure exchanger of claim 5, wherein at least one spark ignitor extends radially through the inner tube into one of the plurality of combustion cells.

8. The dynamic pressure exchanger of claim 1, further comprising a timing system configured to energize the spark ignitors at predetermined intervals based on position data of the rotor assembly such that a primary circuit breaker controls ignition based on encoder information.

9. A dynamic pressure exchanger comprising
a rotor assembly mounted for rotation about a central axis of the dynamic pressure exchanger, the rotor assembly formed to define a plurality of axially-extending combustion cells arranged adjacent one another circumferentially around the central axis, and each combustion cell being arranged to conduct a combustible fluid axially through the rotor assembly, and
an ignition system configured to produce two or more axially spaced apart electric sparks in each combustion cell to cause the combustible fluid in each combustion cell to ignite in multiple locations, the ignition system including:
a plurality of spark ignitors configured to produce electric sparks when being electrically energized and at least two spark ignitors extend into each of the plurality of combustion cells, and
a plurality of electrically energized terminals spaced apart from one another axially and circumferentially around the rotor assembly to ignite the plurality of spark ignitors at different circumferential locations relative to one another, the rotor assembly mounted for rotation relative to the terminals about the central axis, and the plurality of terminals are configured to cause each of the spark ignitors in a single combustion cell to produce electric sparks independent of the other spark ignitors in the single combustion cell, wherein the rotor assembly includes an inner tube, an outer tube arranged around the inner tube, and a plurality of axially-extending webs located radially between the inner and outer tubes to form the combustion cells, and wherein the plurality of spark ignitors extend radially outward through the inner tube into the combustion cells.

10. The dynamic pressure exchanger of claim 9, wherein the plurality of spark ignitors extend radially through the outer tube into the combustion cells.

11. The dynamic pressure exchanger of claim 9, further including an inlet plate formed to include an inlet port that extends circumferentially along an arc about the central axis of the dynamic pressure exchanger and the combustion cells are arranged to align circumferentially with the inlet port as the rotor assembly rotates about the central axis relative to the inlet plate.

12. A method of operating a dynamic pressure exchanger, the method comprising rotating a rotor assembly about a central axis of the dynamic pressure exchanger relative to an inlet plate formed to include an inlet port, the rotor assembly formed to include a plurality of combustion cells configured to align with the inlet port as the rotor assembly rotates about the central axis, conducting a fuel mixture into a first cell of the plurality of combustion cells through the inlet port while the first cell is aligned with the inlet port, igniting the fuel mixture in the first cell at a plurality of ignition locations while the first cell is misaligned with the inlet port, and timing the ignition of the fuel mixture based on position data of the rotor assembly such that a primary circuit breaker controls the ignition timing based on encoder information, wherein igniting the fuel mixture in the first cell includes electrically charging a plurality of spark ignitors that extend into the first cell to cause each spark ignitor to produce an electric spark, electrically charging a plurality of terminals spaced apart from one another axially and circumferentially and arranged to power the plurality of spark ignitors that extend into the first cell so that the plurality of spark ignitors ignite axially in series and at different circumferential locations relative to one another based on the position data of the rotor assembly before the first cell is aligned with the inlet port, wherein the rotor assembly includes an inner tube, an outer tube arranged circumferentially around the inner tube, and a plurality of axially-extending webs located between the inner and outer tubes to define the plurality of combustion cells and the spark ignitors extend radially inward through the outer tube toward the inner tube and radially outward through the inner tube toward the outer tube.

13. The dynamic pressure exchanger of claim 9, further comprising a timing system configured to energize the spark ignitors at predetermined intervals based on position data of the rotor assembly such that a primary circuit breaker controls ignition based on encoder information.

* * * * *